Feb. 25, 1969  J. LEBLANC  3,429,409
APPARATUS OF THE ELECTROMAGNETIC TYPE, INCLUDING FRICTION
DISCS, SUCH AS CLUTCHES AND BRAKES
Filed Sept. 9, 1966

INVENTOR
JEAN LEBLANC
BY
Bailey, Stephens + Huettig
ATTORNEY

United States Patent Office 3,429,409
Patented Feb. 25, 1969

3,429,409
APPARATUS OF THE ELECTROMAGNETIC TYPE, INCLUDING FRICTION DISCS, SUCH AS CLUTCHES AND BRAKES
Jean Leblanc, Lyon, France, assignor to Societe Industrielle Generale de Mecanique Appliquee (S.I.G.M.A.), Paris, France
Filed Sept. 9, 1966, Ser. No. 578,237
Claims priority, application France, Sept. 10, 1965, 31,091
U.S. Cl. 192—84            7 Claims
Int. Cl. F16d 27/02

ABSTRACT OF THE DISCLOSURE

The apparatus comprises an electromagnet having a yoke surrounding a winding. An axially movable armature, having a single transverse annular pole face located opposite to a corresponding pole face formed on a pole piece extending the yoke, moves axially away from the electromagnet when the electromagnet is energized, thus compressing two sets of friction discs against an annular abutment. In this manner a torque is transmitted between a shaft which is fixed with respect to one of these sets of discs, and a shaft which is fixed with respect to the other set of discs.

The present invention relates to electromagnetic apparatus, such as clutches and brakes, which include, in order to transmit a torque between two parts at least one of which is a rotary part, two sets of discs fixed in rotation to said two parts, respectively each disc of one set being located between two discs of the other set, the whole of said two sets of discs being interposed between an abutment ring and the movable armature of an annular electromagnet, the abutment ring and the electromagnet yoke being prevented from moving axially with respect to said two parts whereas the electromagnet armature is movable axially with respect to them, the whole being such that, when the electromagnet is energized for transmission of a torque, the movable armature is urged toward the abutment ring and thus compresses the pack of friction discs together.

The chief object of the present invention is to provide an apparatus of this kind which is better adapted to meet the requirements of practice than those known up to the present time.

For this purpose, an apparatus according to the present invention is characterized in that said yoke is provided with an extension made of a magnetic material and forming a pole piece having a single pole face adapted to cooperate with a pole face parallel thereto and formed on the movable armature, this last mentioned pole face being located between the first mentioned pole face and the electromagnet winding, whereby energization of the electromagnet moves the armature axially away from the winding of said electromagnet.

Preferred embodiments of the present invention will be hereinafter described with reference to the appended drawings, given merely by way of example, and in which.

Figure 1:
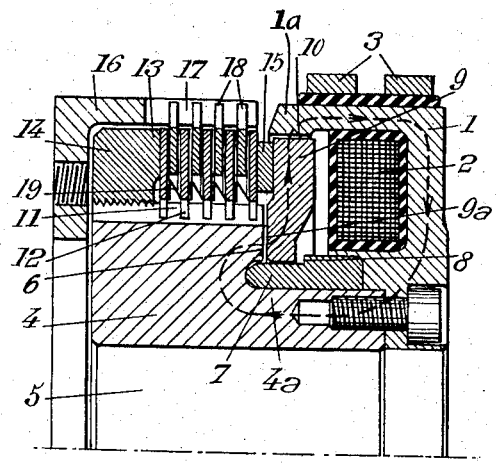
FIG. 1 is a half section of an electromagnetic clutch device with slip rings made according to a first embodiment of the invention.

The clutches illustrated by the drawings comprise a yoke 1 belonging to an annular electromagnet and surrounding the magnetizing winding 2 thereof. The yoke 1 includes a cylindrical extension 1a extending axially beyond the winding 2 on the radially outer side of this winding. In the embodiment of FIG. 1, this winding is fed through two slip rings 3 and brushes (not shown by the drawings) cooperating with said rings.

This yoke carries, fixed thereto, a pole piece 4 of a magnetic material provided with a central passage 5 adapted to house a shaft (not shown on the drawings). This pole piece 4 has an annular pole face 6 transverse to the axis of the device and located opposite winding 2. The portion of pole piece 4 on the right of pole face 6 forms a neck 4a the outer diameter of which is smaller than that of the remainder of piece 4. Around this neck 4a is fixed a sleeve 7 of a nonmagnetic material, such as bronze, provided with an annular transverse abutment 8.

A movable armature 9, made of a magnetic material, has an annular pole face 9a located opposite annular pole face 6. This armature 9 is slidable axially on sleeve 7 between pole face 6 and abutment 8. The outer cylindrical surface of said movable armature 9 is separated by a narrow annular radial air gap 10 from the inner cylindrical surface of the end of yoke 1. The portion of pole piece 4 extending on the left of its neck 4a is provided on its outer periphery with axial splines 11 which serve to guide a set of discs 12 engaged therein so that said discs can move longitudinally, but cannot rotate, with respect to piece 4. These discs 12 are slidable between the annular abutment surface 13 of an abutment ring 14 screwed on piece 4 and a ring 15 of a nonmagnetic material secured on the side of movable armature 9 which is not turned toward winding 2. Said ring 15 ensures mechanical contact between movable armature 9 and friction discs 12. The whole of the pieces above referred to constitutes the first rotating unit of the clutch.

The second rotating unit of the clutch includes a bell-shaped element 16 provided with longitudinal arms 17 between which are slidably guided lugs provided on the outline of friction discs 18. These discs 18 are inserted between discs 12, respectively, i.e. each disc 18 between two consecutive discs 12, expansible washers 19 being placed between discs 12 so as to move them away from one another when the electromagnet is not energized.

The apparatus above described therefore comprises in succession in the axial direction, winding 2, movable armature 9, friction discs 12 and 18, abutment ring 14 and bell-shaped element 16, the arms 17 of which extend substantially as far as movable armature 9.

The magnetic flux of the electromagnet follows a path indicated in FIG. 1 by the dotted lines provided with arrows. This path is closed through yoke 1, pole piece 4, the air gap between pole faces 6 and 9a, movable armature 9 and radial air gap 10.

Therefore this magnetic flux does not pass through friction discs 12 and 18, which permits the use of discs provided with nonmagnetic linings such as moulded or sintered linings. The magnetic flux also does not pass through ring 15.

It will be supposed that this device serves to transmit a torque between a part consisting of a shaft on which pole piece 4 is fixed and a part consisting of a shaft on which bell-shaped element 16 is fixed. When both of these shafts are rotary shafts, the device constitutes a clutch, whereas, if only one of the two shafts is rotary, the apparatus constitutes a brake.

This device works as follows:

When a direct current flows through winding 2, the magnetic circuit is deformed so as to reduce its own reluctance. Pole face 9a moves towards pole face 6, each other and movable armature 9 moves axially away from winding 2 so as to compress discs 12 and 18 together and against abutment ring 13. Thus said discs frictionally engage one another and a torque is transmitted between the two above mentioned shafts.

Figure 2:
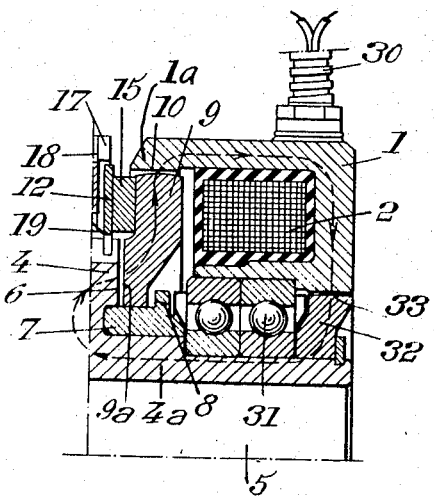
FIG. 2 is a similar view of another embodiment of the invention, wherein the device does not include a slip ring.

In the embodiment illustrated by FIG. 2, the device constitutes a clutch without slip ring means, the arrangement being similar to that of FIG. 1 with the following differences. The electromagnet is fixed and it is provided with a current feed cable 30. The yoke 1 of said electromagnet is disposed about the neck 4a of pole piece 4 acting as a hub, with the interposition of ball bearing 31 adapted to prevent axial movements of pole piece 4 with respect to yoke 1. This bearing 31 is held between sleeve 7, made of a nonmagnetic material, and a sleeve 32 made of a magnetic material secured to neck 4a. Between sleeve 32 and yoke 1, there is provided a narrow cylindrical radial air gap 33. The operation of the device of FIG. 2 is the same as that above described with reference to FIG. 1 with the only difference that, since yoke 1 is fixed, the magnetic flux must pass through the air gap 33 between said yoke and sleeve 32.

Such a device has the following advantages.

The magnetic circuit arrangement permits of using the device for operation in the dry state, since it permits the use of discs with nonmagnetic linings such as moulded or sintered linings.

Movable armature 9, which may be of light weight and therefore has a low mechanical inertia, permits of obtaining very short times of response.

The shape of all of the pieces permits of reducing the total volume of the device and facilitates the manufacture thereof.

The shape of the magnetic circuit makes it suitable for clutches with a single disc or multiple discs, with or without slip rings, and also for toothed brakes and clutches.

In a general manner, while the above description discloses what are deemed to be practical and efficient embodiments of the present invention, said invention is not limited thereto as there might be changes made in the arrangement, disposition, and form of the parts without departing from the principle of the invention as comprehended within the scope of the appended claims.

What I claim is:

1. An electromagnetic apparatus for temporarily coupling together in rotation two parts having a common axis and at least one of which is rotatable about said axis, which apparatus comprises, in combination,
  an annular electromagnet of revolution about said axis,
  an annular abutment coaxial with said electromagnet and fixed axially with respect thereto,
  said annular electromagnet including a winding and a yoke which surrounds said winding except for an annular portion of said winding facing said annular abutment, which annular portion is left free, said yoke including an outer cylindrical extension extending beyond said winding axially toward said annular abutment,
  an annular pole piece of a magnetic material coaxial with said yoke and fixed axially with respect thereto and forming therewith a magnetic circuit portion, said annular pole piece being adapted to be fixed with respect to one of said parts, said annular pole piece having only a single annular pole face zone transverse to said axis,
  an element of revolution about said axis adapted to be fixed with respect to the other of said parts,
  two sets of friction discs a first one and a second one, coaxial with said electromagnet, said discs being transverse to said axis and slidable axially with respect to said annular pole piece and to said element, one of said sets being fixed angularly with respect to said annular pole piece, the other set being fixed angularly with respect to said element, the discs of one set being disposed alternately with the discs of the other set,
  means for preventing the passage of magnetic flux through said discs,
  said annular abutment being adapted to cooperate with said discs,
  an annular armature of a magnetic material surrounding said annular pole piece and slidable axially with respect to said annular pole piece and extending radially inward of said cylindrical extension of said yoke, with a small annular radial air gap between said yoke extension and said armature, said armature having only a single annular pole face zone transverse to said axis and located opposite the single annular pole face zone of said annular pole piece,
  and a sleeve of nonmagnetic material fixed on said pole piece and separating said armature radially from said pole piece,
  the whole being such that energizing of said electromagnet moves said armature away from said winding and toward the pole face zone of said pole piece to press said two sets of discs against each other and against said annular abutment.

2. An apparatus according to claim 1 wherein said sleeve is provided with an abutment on the side of said electromagnet winding, said armature being mounted slidable axially on said sleeve, whereby said abutment limits axial sliding of said armature in the direction towards said winding.

3. An apparatus according to claim 1 further comprising, on the side of said slidable armature, which does not face said electromagnet winding, a ring of nonmagnetic material ensuring mechanical contact between said slidable armature and said friction discs.

4. An apparatus according to claim 1 wherein said discs are provided with nonmagnetic linings.

5. An apparatus according to claim 1 wherein said pole piece constitutes a hub capable of receiving a shaft which is one of said two parts and is provided on its periphery with longitudinal splines, further comprising an abutment ring adjustably fixed to said pole piece, said discs being mounted about said splined pole piece between said slidable armature and said abutment ring.

6. An apparatus according to claim 5 wherein said pole piece is rigid with said electromagnet yoke, further including at least one collector ring located on the periphery of said yoke.

7. An apparatus according to claim 5 wherein said electromagnet yoke is fixed, further comprising a bearing between said yoke and said pole piece.

References Cited

UNITED STATES PATENTS

| | | | |
|---|---|---|---|
| 2,267,114 | 12/1941 | Lear et al. | 192—84 |
| 2,378,108 | 6/1945 | Ryba. | |
| 2,933,171 | 4/1960 | Kraeplin | 192—84 |
| 2,945,573 | 7/1960 | Wiedmann. | |
| 3,300,008 | 1/1967 | Mendenhall. | |

GEORGE HARRIS, *Primary Examiner.*

U.S. Cl. X.R.

335—220